United States Patent
Yang et al.

(10) Patent No.: US 7,377,653 B2
(45) Date of Patent: *May 27, 2008

(54) COLOR DISPLAY APPARATUS HAVING VIRTUAL SINGLE LIGHT ORIGIN

(75) Inventors: Haeng Seok Yang, Gyeonggi-do (KR); Dong Ho Shin, Seoul (KR); Kwan Young Oh, Gyeonggi-do (KR); Jun Won An, Gyeonggi-do (KR); Sang Kyeong Yun, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 195 days.

This patent is subject to a terminal disclaimer.

(21) Appl. No.: 11/157,480

(22) Filed: Jun. 21, 2005

(65) Prior Publication Data

US 2006/0083124 A1   Apr. 20, 2006

(30) Foreign Application Priority Data

Oct. 15, 2004   (KR) .................... 10-2004-0082750

(51) Int. Cl.
*G03B 21/28* (2006.01)
*H04N 5/74* (2006.01)

(52) U.S. Cl. .................... 353/31; 353/84; 348/770

(58) Field of Classification Search ............... 353/30, 353/31, 84, 94, 97, 122; 348/800–803, 770; 348/771; 349/69
See application file for complete search history.

(56) References Cited

U.S. PATENT DOCUMENTS

| | | | |
|---|---|---|---|
| 5,374,947 A | | 12/1994 | Takahashi et al. |
| 6,084,626 A | * | 7/2000 | Ramanujan et al. ........ 347/239 |
| 7,042,606 B2 | * | 5/2006 | Yang et al. ................. 359/204 |
| 7,173,751 B2 | * | 2/2007 | Yun .......................... 359/291 |
| 7,248,408 B2 | * | 7/2007 | Yun .......................... 359/567 |
| 2003/0133079 A1 | * | 7/2003 | Cobb ......................... 353/31 |
| 2004/0075817 A1 | * | 4/2004 | Agostinelli et al. .......... 353/34 |
| 2005/0068609 A1 | * | 3/2005 | Trisnadi et al. ............ 359/291 |
| 2006/0082735 A1 | * | 4/2006 | Yang et al. ................... 353/84 |
| 2006/0208175 A1 | * | 9/2006 | Yun ...................... 250/231.16 |
| 2006/0262663 A1 | * | 11/2006 | Yun et al. ..................... 369/1 |

\* cited by examiner

*Primary Examiner*—Andrew T Sever
(74) *Attorney, Agent, or Firm*—Christensen O'Connor Johnson Kindness PLLC

(57) ABSTRACT

A color display apparatus having a virtual single light origin is disclosed. The color display apparatus includes an illumination lens system, a combining system, a Fourier filter and a projection system. The illumination lens system converts a plurality of light beams, which are radiated from a plurality of light sources, into linear, parallel light beams. The combining system produces a plurality of diffracted light beams having a plurality of diffraction orders by modulating each of the parallel light beams incident from the illumination lens, and outputs the plurality of diffracted light beams so that the diffracted light beams have a same virtual light origin and are adjacently located. The Fourier filter passes only some of the diffracted light beams, which have desired diffraction orders, therethrough. The projection system focuses the diffracted light beams, which are passed through the Fourier filter, on an object, and then allows the focused diffracted light beams to scan the object.

17 Claims, 8 Drawing Sheets

FIG. 10

COLOR DISPLAY APPARATUS HAVING VIRTUAL SINGLE LIGHT ORIGIN

BACKGROUND OF THE INVENTION

1. Field of the Invention

The present invention relates generally to a color display apparatus and, more particularly, to a color display apparatus having a virtual single light origin, which produces diffracted light beams by modulating light beams radiated from a plurality of light sources, converges and outputs the diffracted light beams so that the diffracted light beams have the same virtual light origin, passes only some of the diffracted light beams having desired orders therethrough, and projects the diffracted light beams onto a screen.

2. Description of the Related Art

A light beam scanning apparatus is an apparatus for producing an image by causing a light beam to form spots on a photosensitive medium through scanning in an image forming apparatus such as a laser printer, a display device, a Light Emitting Diode (LED) printer, an electrophoto copying machine or a word processor.

As image forming apparatuses develop toward compactness, high speed and high resolution, light beam scanning apparatuses have been accordingly researched and developed to have the characteristics of compactness, high speed and high resolution.

Light beam scanning apparatuses for image forming apparatuses may be mainly classified into laser scanning type apparatuses using an f·θ lens, and image head printer type apparatuses, according to the light beam scanning method and the construction of a light beam scanning apparatus.

Figure 1:
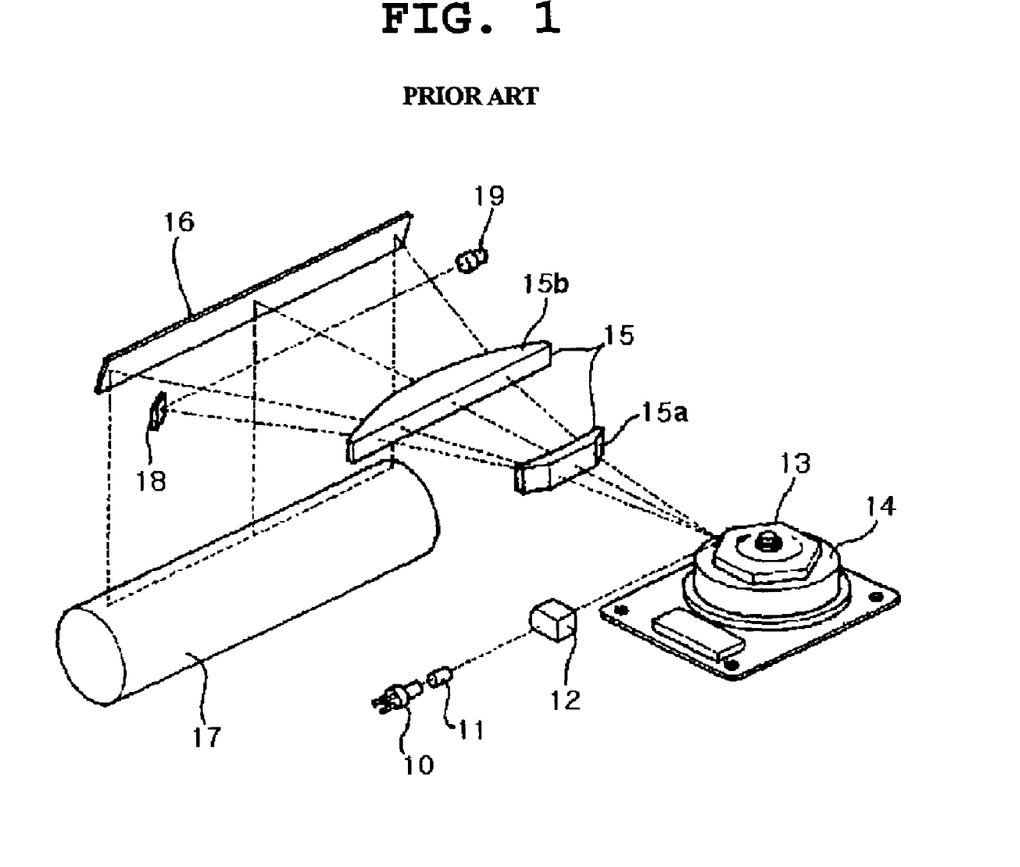
FIG. 1 is a perspective view showing the construction of a conventional laser scanning apparatus using a single light source and an f·θ lens.

FIG. 1 is a perspective view showing the configuration of a conventional laser scanning apparatus using an f·θ lens.

Referring to FIG. 1, the conventional laser scanning apparatus includes a Laser Diode (LD) 10 that radiates a light beam in response to a video signal, a collimator lens 11 that converts the light beam, which is radiated from the LD 10, into parallel light, a cylinder lens 12 that converts the parallel light, which is passed through the collimator lens 11, into linear light coplanar with a scanning direction, a polygon mirror 13 that reflects the linear light, which is passed through the cylinder lens 12, while moving it at a constant linear velocity, a polygon mirror driving motor 14 that rotates the polygon mirror 13 at a constant velocity, an f·θ lens 15 that has a constant refractive index with respect to an optical axis, deflects the light, which is reflected by the polygon mirror 13 and which has a constant angular velocity, in a principal scanning direction, corrects aberrations of the light and focuses the corrected light on an illumination surface, a reflection mirror 16 that reflects the light beam, which is passed through the f·θ lens 15, in a predetermined direction and forms a dot-shaped image on the surface of a photosensitive drum 17, that is, an image plane, a horizontal sync mirror 18 that reflects the laser beam, which is passed through the f·θ lens 15, in a horizontal direction, and an optical sensor 19 that receives the laser beam, which is reflected by the horizontal sync mirror 18, and performs synchronization.

It is difficult for the above-described laser scanning type light beam scanning apparatus to achieve high-speed printing, due to the low switching speed of the laser diode 10 and the speed problem of the polygon mirror 13.

That is, to increase the scanning speed of the light beam, the polygon mirror 13 must be rotated using a high-speed motor. However, the high-speed motor is expensive, and the motor operating at high speed generates heat, vibration and noise, thus degrading operational reliability, so that a significant improvement in scanning speed cannot be expected.

Another scheme for improving the speed of the light beam scanning apparatus relates to an image head printing type light beam scanning apparatus using a multi-beam type beam formation apparatus.

Such a multi-beam optical scanning apparatus has a plurality of light emitting parts (laser heads) as light sources. The multi-beam optical scanning apparatus optically scans the surface of a recording medium using a plurality of light spots formed on the surface of the recording medium in such a way that a plurality of light beams radiated from the plurality of light emitting parts is focused by an imaging lens through an optical reflector.

In order to accomplish high-speed printing using only a single light spot, the number of times the surface of the recording medium is optically scanned per unit time must be significantly large. Meanwhile, the rotational speed of the optical reflector and the image clock cannot comply with the large number of optical scans. Accordingly, if the number of beam spots that simultaneously scan the surface of the recording medium increases, the rotational speed of the optical reflector and the image clock may be reduced in proportion to the number of beam spots.

In order to form a plurality of beam spots in the most effective manner, a laser element that functions as a light source has a plurality of light emitting points (light emitting parts) that can be independently operated.

Such a laser element having a plurality of light emitting points is commonly called a "monolithic multi-beam laser element." When the monolithic multi-beam laser element is used, most of optical elements disposed behind the light source can be used for a plurality of light beams, so that the monolithic multi-beam laser element provides significant advantages in terms of cost, process and control.

Figure 2:
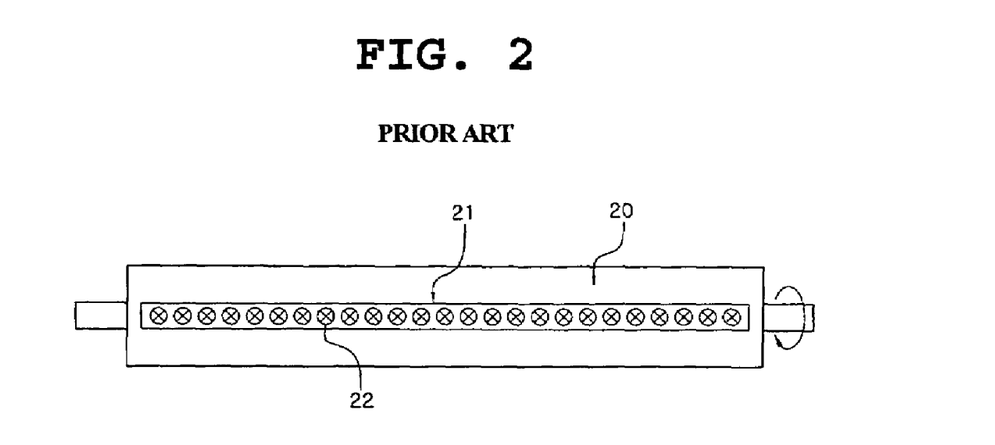
FIG. 2 is a view showing a conventional laser scanning scheme in which laser scanning is performed by a plurality of beams produced by an LED array formed in an image head.

FIG. 2 is a view illustrating a conventional laser scanning scheme in which laser scanning is performed by a plurality of beams produced by an LED array disposed in an image head.

Referring to FIG. 2, an LED array 21 is disposed in an image head 20 to have LEDs that can cover the width of printing paper, and generates a plurality of beams. Unlike the laser scanning scheme, printing can be performed on a line-at-a-time basis without using a polygon mirror or an f·θ lens, thus significantly improving printing speed.

This monolithic multi-beam laser element includes a so-called surface emitting laser (surface emitting type semiconductor laser).

The surface emitting laser emits light beams parallel to the thickness direction of a silicon layer, whereas a conventional semiconductor laser emits light beams perpendicular to the thickness direction of a silicon layer.

Furthermore, the surface emitting laser has the following characteristics. That is, the conventional semiconductor laser emits divergent light that has an elliptical cross section and considerably varied divergence angles, whereas the surface emitting laser can emit a circular beam that has a stabilized divergence angle.

However, the surface emitting laser has a problem in that an output light beam has an unstable polarization direction. Although the polarization direction can be controlled by the manufacturing method to some degree, it varies depending upon a light emitting point, ambient temperature and output.

The reflectance, transmittance and angle characteristics of the optical elements of an optical scanning apparatus, such as a polygonal mirror like an optical reflector, the scanning lens (f·θ lens) of an optical imaging system, and an echo mirror for changing an optical path, vary depending upon the polarization direction of an input light beam.

For this reason, when the monolithic multi-beam laser element including a surface emitting laser is used as the light source of an optical scanning apparatus, a plurality of beam spots that optically scans the surface of a recording medium have different intensities due to the different polarization directions of light emitting points. Further, the difference in intensity results in irregular pitch in an image, thus considerably degrading image quality.

SUMMARY OF THE INVENTION

Accordingly, the present invention has been made keeping in mind the above problems occurring in the prior art, and an object of the present invention is to provide a color display apparatus, which produces diffracted light beams by modulating light beams radiated from a plurality of light sources, passes only some of the diffracted light beams having desired diffraction orders through a filter, and then projects the passed diffracted light beams onto a screen.

In order to accomplish the above object, the present invention provides a color display apparatus having a virtual single light origin, including an illumination lens system for converting a plurality of light beams, which are radiated from a plurality of light sources, into linear, parallel light beams; a combining system for producing a plurality of diffracted light beams having a plurality of diffraction orders by modulating each of the parallel light beams incident from the illumination lens, and outputting the plurality of diffracted light beams so that the diffracted light beams have a same virtual light origin and are adjacently located; a Fourier filter for passing only some of the diffracted light beams, which have desired diffraction orders, therethrough; and a projection system for focusing the diffracted light beams, which are passed through the Fourier filter, on an object, and then allowing the focused diffracted light beams to scan the object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The construction of a color display apparatus having a virtual single light origin according to the present invention is described in detail in connection with preferred embodiments with reference to the accompanying drawings.

Figure 3:
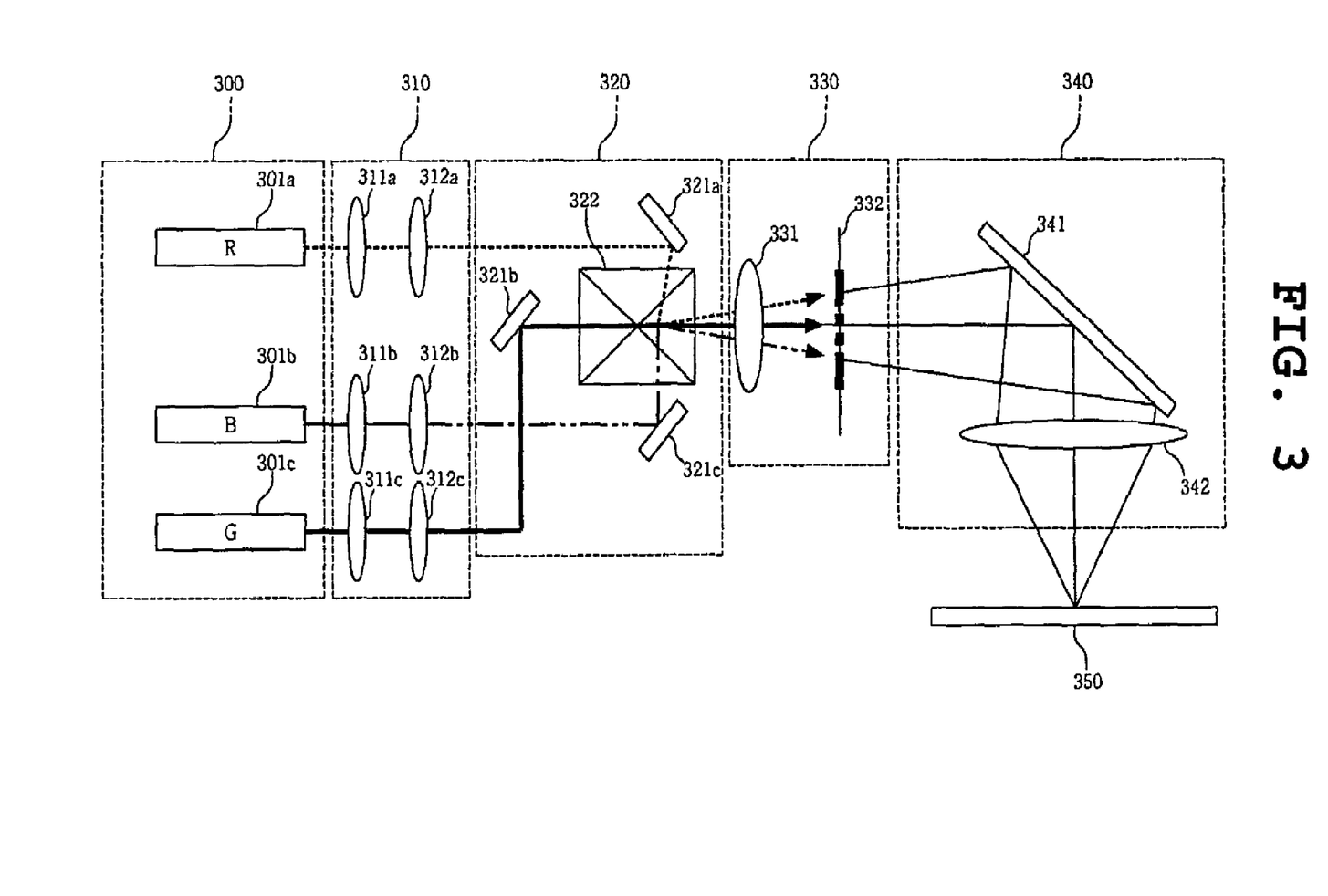
FIG. 3 is a view showing the construction of a color display apparatus having a virtual single light origin according to an embodiment of the present invention.

FIG. 3 is a view showing the construction of a color display apparatus having a virtual single light origin according to an embodiment of the present invention.

Referring to FIG. 3, the color display apparatus having the virtual single light origin according to the embodiment of the present invention includes a plurality of light sources 300, an illumination lens 310, a combining system 320, a Fourier filter 330, a projection system 340, and a screen 350.

The plurality of light sources 300 is composed of, for example, a red light source 301a, a blue light source 301b and a green light source 301c. The plurality of light sources 300 may be light sources that are formed of semiconductor devices such as LEDs or Laser Diodes (LDs). Such semiconductor light sources have many characteristics that are suitable for use in color display apparatuses compared to other light sources.

Figure 4A:
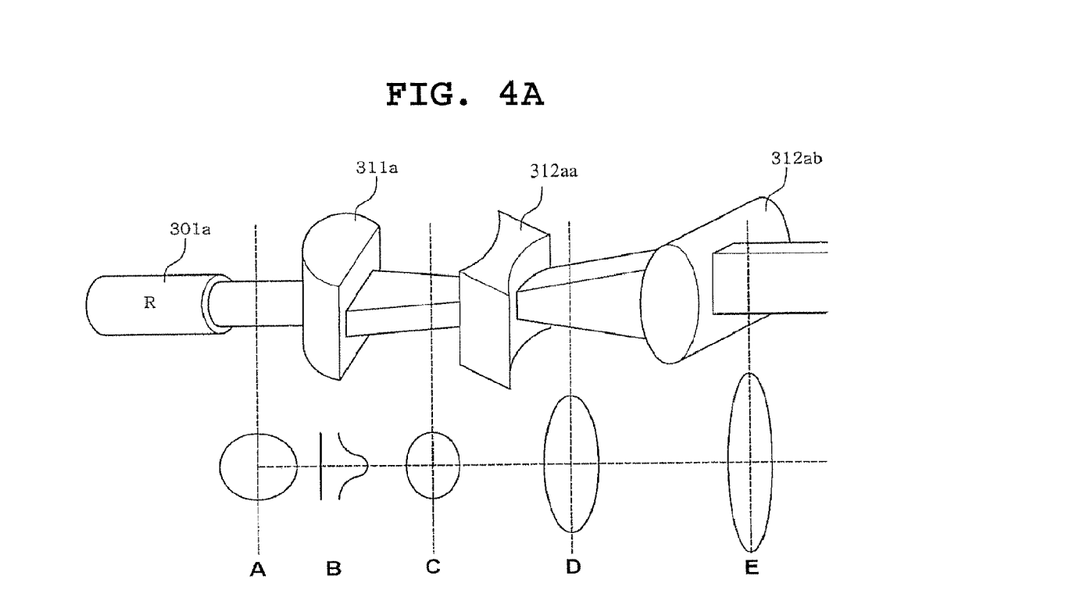
FIGS. 4a to 4c are a perspective view, a plan view, a side sectional view and a cross section showing an optical path produced through the illumination lens of FIG. 3, respectively.
Figure 4B:
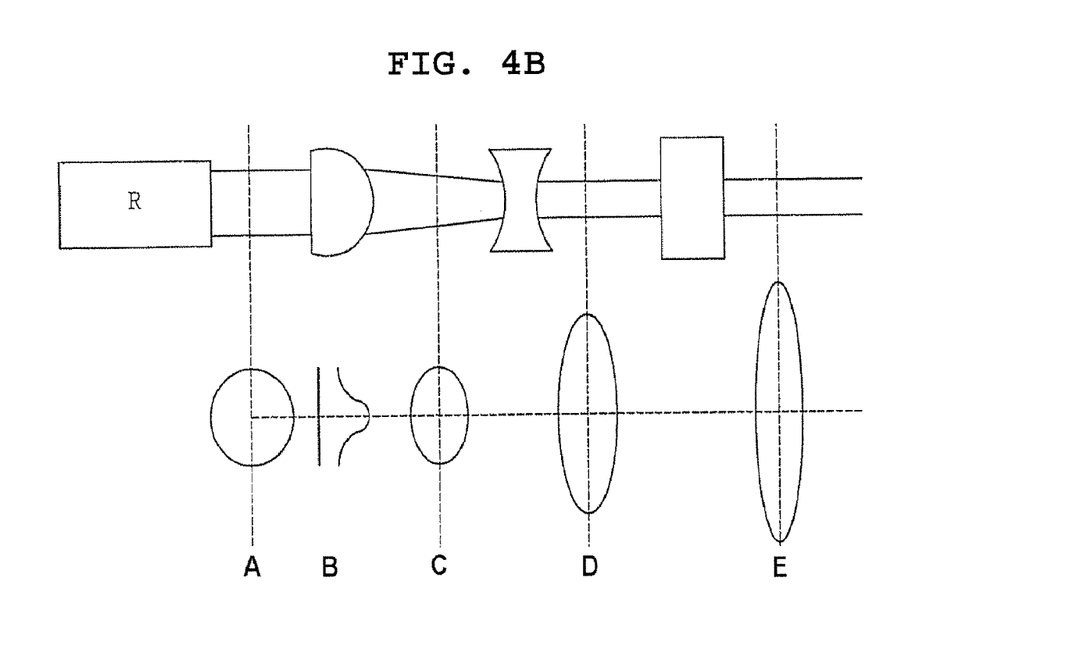
Figure 4C:
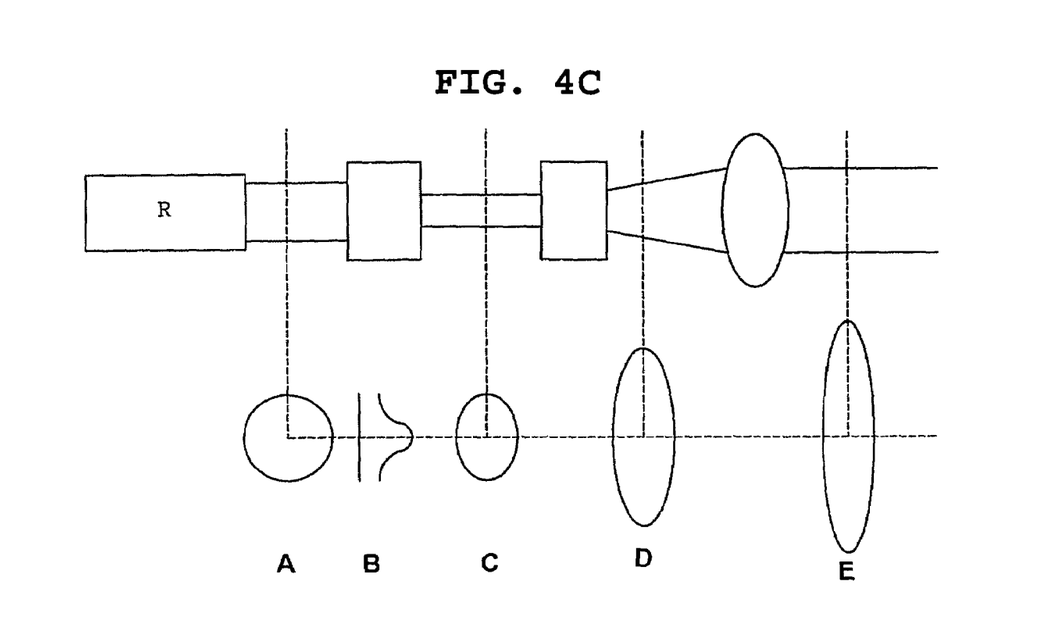

A cross section of the light beam is indicated by "A" of FIG. 4A to 4C. Referring to "A" of FIG. 4A to 4C, the cross section of the light beam is circular, and the intensity profile of the light beam has Gaussian distribution as indicated by "B" of FIG. 4A to 4C.

The illumination lens 310 converts incident light into linear parallel light having an elliptical cross section. The illumination lens 310 is composed of a plurality of cylinder lenses 311a to 311c and a plurality of collimator lenses 312a to 312c.

That is, the illumination lens 310 converts light beams, which are radiated from the plurality of light sources 300 (301a to 301c), into linear light beams coplanar with optical paths, and then focuses them onto diffractive light modulators 321a to 321c, which will be described later.

In this case, the cylinder lenses 311a to 311c convert the parallel beams, which are radiated from the plurality of light sources 310a to 310c, into linear light beams indicated by "C" of FIG. 4D, and then allow the linear light beams to be incident on the diffractive light modulators 321a to 321c through the collimator lenses 312a to 312c.

In this case, the plurality of collimator lenses 312a to 312c convert spherical light beams, which are radiated from the light source 300 through the cylinder lenses 311a to 311c, into parallel light beams, and then allow them to be incident on the diffractive light modulators 321a to 321c.

The collimator lens 312a (although only the collimator lens 312a is described herein, the remaining collimator lenses have the same construction and operation) includes a concave lens 312aa and a convex lens 312ab, as shown in FIGS. 4A to 4C. The concave lens 312aa vertically stretches a linear light beam incident from the cylinder lens 311a, as indicated by "D" of FIG. 4A to 4C, and then allows it to be incident on the convex lens 312ab. The convex lens 312ab converts the light beam incident from the concave lens 312aa into a parallel light beam, as indicated by "E" of FIG. 4A to 4C, and then outputs the parallel beam. FIG. 4A is a perspective view illustrating an optical system having a light source, a cylinder lens and a collimator lens, FIG. 4B is a plan view of FIG. 4A, FIG. 4C is a side sectional view of the optical system.

The combining system 320 includes a plurality of open hole-type diffractive light modulators 321a to 321c and a beam splitter 322. The open hole-type diffractive light modulators 321a to 321c produce diffracted beams by diffracting incident beams. The beam splitter 322 combines a plurality of diffracted beams together.

Figure 5:
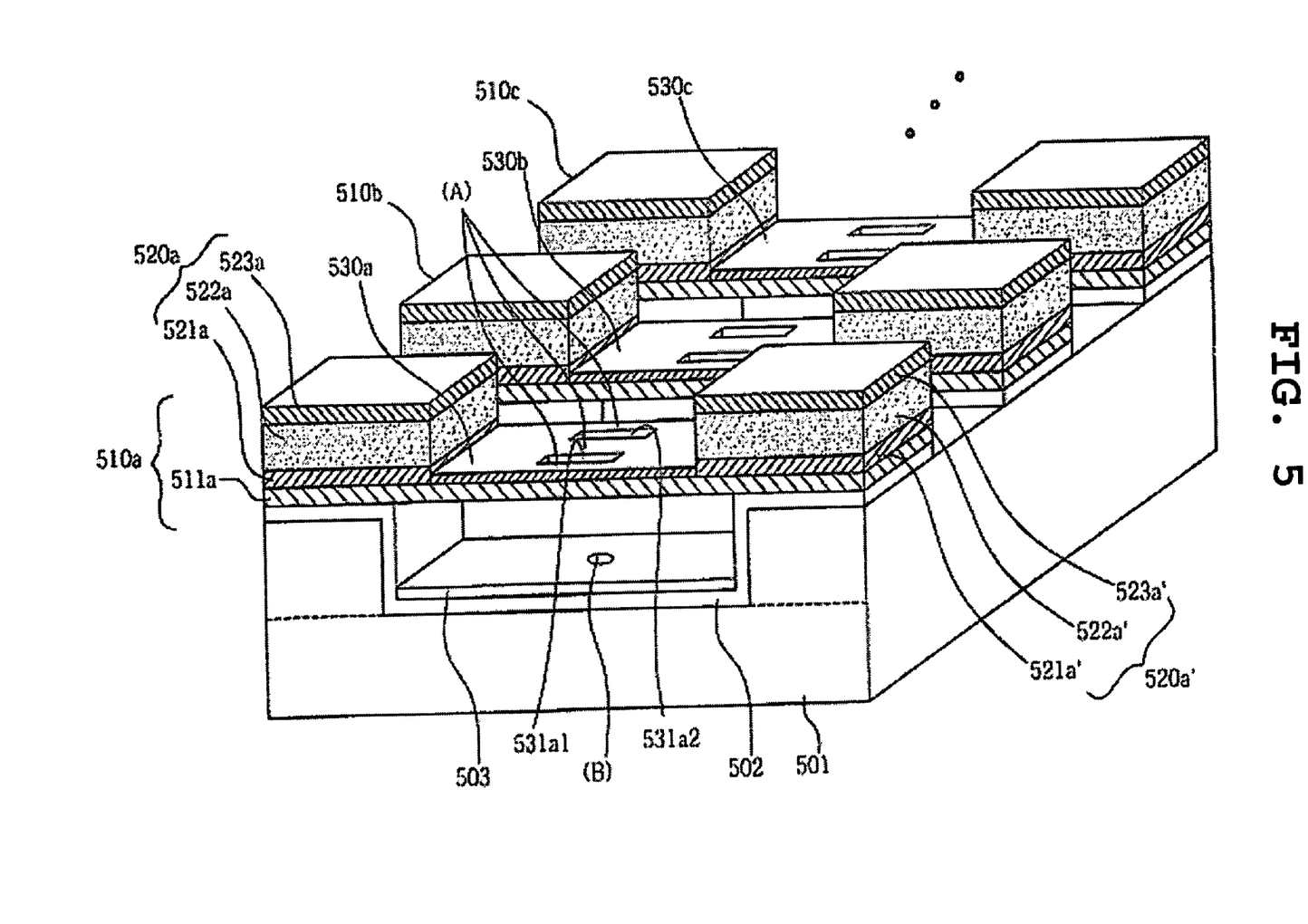
FIG. 5 is a perspective view illustrating the construction of the diffractive light modulator of FIG. 3.

In this case, an example of the open hole-type diffractive light modulators 321a to 321c is shown in FIG. 5.

FIG. 5 is a perspective view showing the construction of the open hole-type diffractive light modulator according to an embodiment of the present invention.

Referring to FIG. 5, the open hole-type diffractive light modulator according to the embodiment of the present invention includes a silicon substrate 501, an insulation layer 502, a lower micro mirror 503, and a plurality of elements 510a to 510n. Although, in the present embodiment, the insulation layer and the lower micro mirror are separately constructed, the insulation layer itself can function as the lower micro mirror if it has a light-reflecting characteristic.

The silicon substrate 501 is provided with a depressed portion to provide air spaces to the elements 510a to 510n. The insulation layer 502 is formed on the silicon substrate 501. The lower micro mirror 503 is deposited on the insulation layer 502 above the depressed portion of the silicon substrate 501. The bottoms of the elements 510a to 510n are attached to both sides of the insulation layer 502 beside the depressed portion of the silicon substrate 501. The silicon substrate 501 can be fabricated of a single material such as Si, $Al_2O_3$, $ZrO_2$, quartz or SiO2. The upper and lower layers (divided by dotted lines in FIG. 5) of the silicon substrate 501 can be fabricated of heterogeneous materials.

The lower micro mirror 503 is deposited above the silicon substrate 501, and diffracts incident light by reflecting it. The lower micro mirror 503 can be fabricated of a metallic material such as Al, Pt, Cr or Ag.

The element 510a (although only the element 510a is described herein, the remaining elements have the same construction and operation) has a ribbon shape. The element 510a includes a lower support 511a, both sides of the bottom of which are attached to both sides of the insulation layer 502 beside the depressed portion of the silicon substrate 501, so that the central portion of the lower support 511a is spaced apart from the depressed portion of the silicon substrate 501.

Piezoelectric layers 520a and 520a' are formed on both sides of the lower support 511a. Driving force is provided to the element 510a by the contraction and expansion of the piezoelectric layers 520a and 520a'.

The lower support 511a may be fabricated of Si oxide such as $SiO_2$, Si nitride such as $Si_3N_4$, a ceramic substrate such as Si, $ZrO_2$ and $Al_2O_3$, and Si carbide. However, the lower support 511a may be omitted when necessary.

Each of the piezoelectric layers 520a and 520a' includes a lower electrode layer 521a or 521a' configured to provide a piezoelectric voltage, a piezoelectric material layer 522a or 522a' formed on the lower electrode layer 521a or 521a' and configured to contract and expand and generate vertical driving force when voltages are applied to both surfaces thereof, and a upper electrode layer 523a or 523a' formed on the piezoelectric material layer 522a or 522a' and configured to provide a piezoelectric voltage to the piezoelectric material layer 522a or 522a'. When voltage is applied to the upper electrode layers 523a and 523a' and the lower electrode layers 521a and 521a', the piezoelectric material layers 522a and 522a' contract and expand, thus causing vertical movement of the lower support 511a.

The electrodes 521a, 521a', 523a and 523a' may be fabricated of a material such as Pt, Ta/Pt, Ni, Au, Al or $RuO_2$, and may be deposited by sputtering or evaporation to have a thickness within a range of 0.01 to 3 μm.

Meanwhile, an upper micro mirror 530a is deposited on the center portion of the top of the lower support 511a, and includes a plurality of open holes 531a1 and 531a2. In this case, the open holes 531a1 and 531a2 preferably have a rectangular shape, but may have any closed curve shape such as a circle or an ellipse. When the lower support 511a is fabricated of a light-reflective material, the upper micro mirror 530a is not necessary. In this case, the lower support 511a may function as the upper micro mirror.

The open holes 531a1 and 531a2 pass light incident on the element 510a therethrough, and allow the light to be incident on the portion of the lower micro mirror 503 corresponding to the portion where the open holes 531a1 and 531a2 are formed, so that the lower micro mirror 503 and the upper micro mirror 530a can form a pixel.

That is, for example, the portion "A" of the upper micro mirror 530a where the open holes 531a1 and 531a2 are formed, and the portion "B" of the lower micro mirror 503 can form a single pixel.

In this case, the incident light, which passes through the portion where the open holes 531a1 and 531a2 of the upper micro mirror 530a are formed, can be incident on the corresponding portion of the lower micro mirror 503. When the distance between the upper micro mirror 530a and the lower micro mirror 503 is an odd multiple of $\lambda/4$, maximally diffracted light is produced. In addition, an open hole-type diffractive light modulator applicable to the present invention is disclosed in U.S. patent application Ser. No. 10/952,573.

Meanwhile, the open hole-type diffractive light modulators 321a to 321c form diffracted light by diffracting linear light incident from the illumination lens 310, and cause the diffracted light to be incident on the beam splitter 322.

Figure 6A:
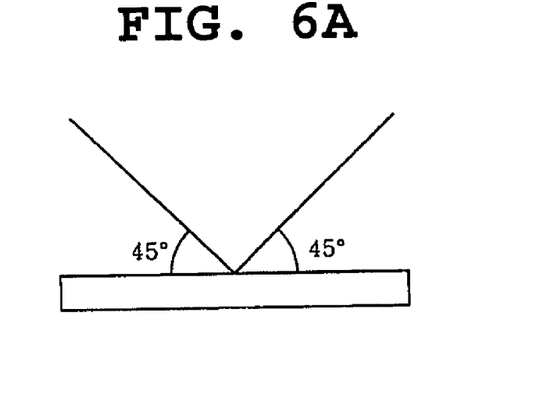
FIGS. 6A and 6B are views illustrating the reflection angle of the diffractive light modulator of FIG. 3.
Figure 6B:
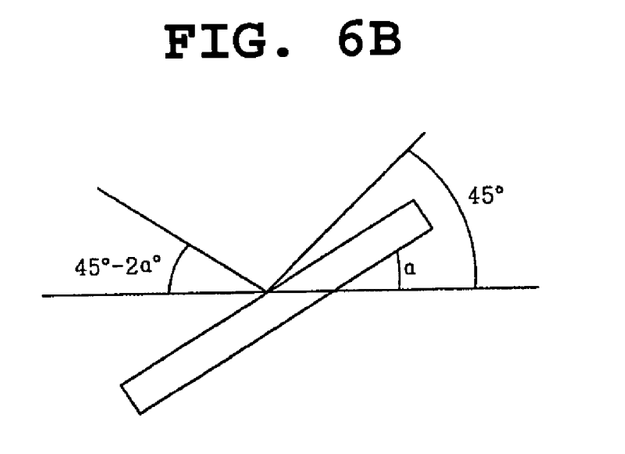

In this case, the reflection angles of the diffracted light are shown in FIGS. 6A and 6B. From FIG. 6A, it can be understood that the incidence angle and reflection angle of light are the same. In other words, if light is incident on the diffractive light modulators 321a to 321c at an incidence angle of 45°, the reflection angle of the light is also 45°. However, as shown in FIG. 6B, if the diffractive light modulators 321a to 321c are inclined at an angle α°, the output angle of the light is 45°-2α°. Accordingly, when the diffractive light modulators 321a to 321c are inclined at an angle α°, the reflection angle varies by 2α° when there is no change in the incidence angle of the light.

Figure 7:
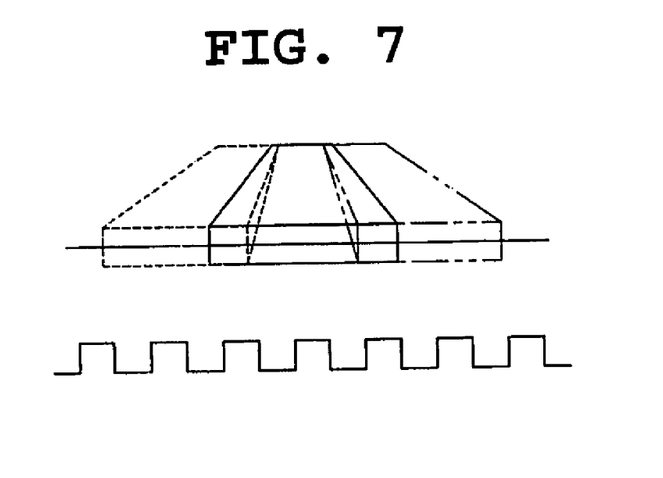
FIG. 7 is a schematic diagram illustrating diffracted light generated by the diffractive light modulator of FIG. 3.

The diffracted light formed by the diffractive light modulators 321a to 321c is shown in FIG. 7. From FIG. 7, it can be understood that 0-order and ±1-order diffracted light are formed in the periodical direction of a lattice.

Figure 8:
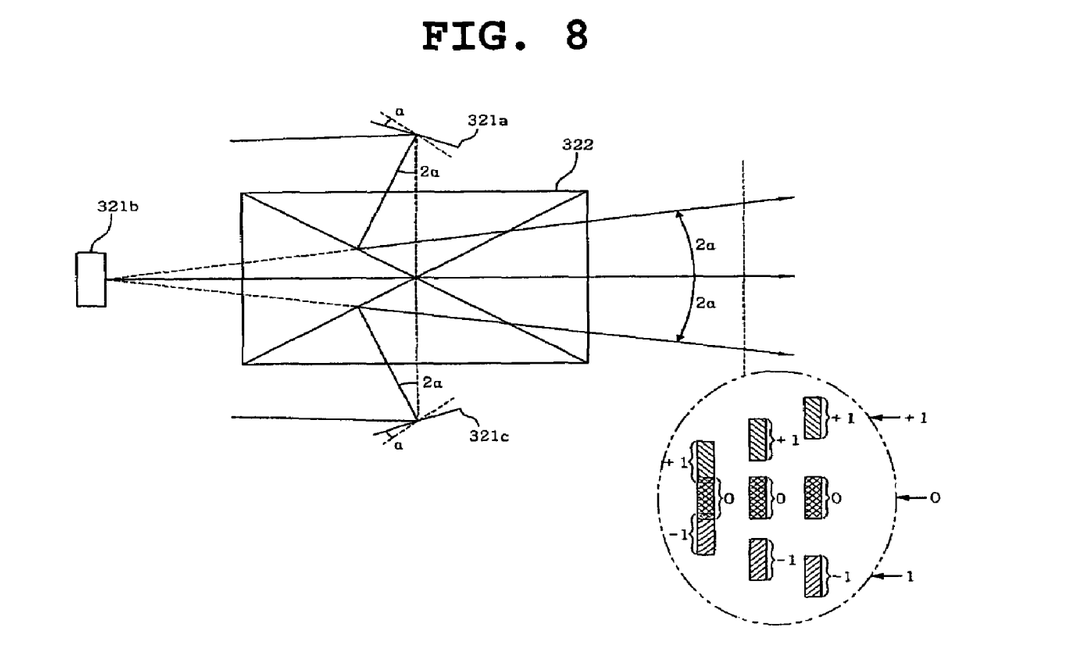
FIG. 8 is a plan view illustrating optical paths produced through the combining system of FIG. 3.

Meanwhile, the diffracted light incident on the beam splitter 322 has an incidence angle, which is greater than 45° by 2α°, as shown in FIG. 8. As a result, the diffracted light reflected by the beam splitter 322 has a reflection angle of 2α° with respect to an X-prism surface. Therefore, as shown in FIG. 8, if the value of the angle α is appropriately adjusted, reflected light beams can be made to seem as if they were output from a single point when the paths of the reflected light beams are virtually extended. In this case, a plurality of light beams can be focused onto one point using an appropriate lens, and scanning can be performed by focusing light on the screen 350.

Furthermore, FIG. 8 shows a sectional view of diffracted light that passes through the beam splitter 322. From FIG. 8, it can be understood that, for diffracted light having a first wavelength, 0-order diffracted light and ±1-order diffracted light overlap each other. Accordingly, it is necessary to separate the 0-order diffracted light and the ±1-order diffracted light using the Fourier filter 330. After the 0-order diffracted light and the ±1 order diffracted light are separated, diffracted light having desired orders can be obtained using a mechanical filter.

Therefore, the Fourier filter 330 is preferably composed of a Fourier lens 331 and a filter unit 332. The Fourier lens 331 separates incident diffracted light on an order basis. The filter unit 332 has a plurality of spatially separated slits, and transmits only diffracted light having desired orders.

Figure 9A:
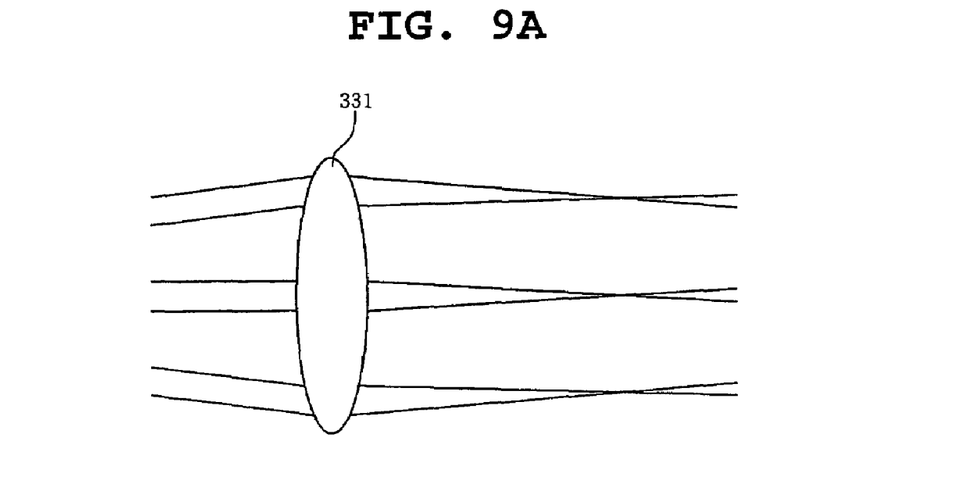
FIGS. 9A and 9B are views illustrating optical paths produced through the Fourier lens of FIG. 3.
Figure 9B:
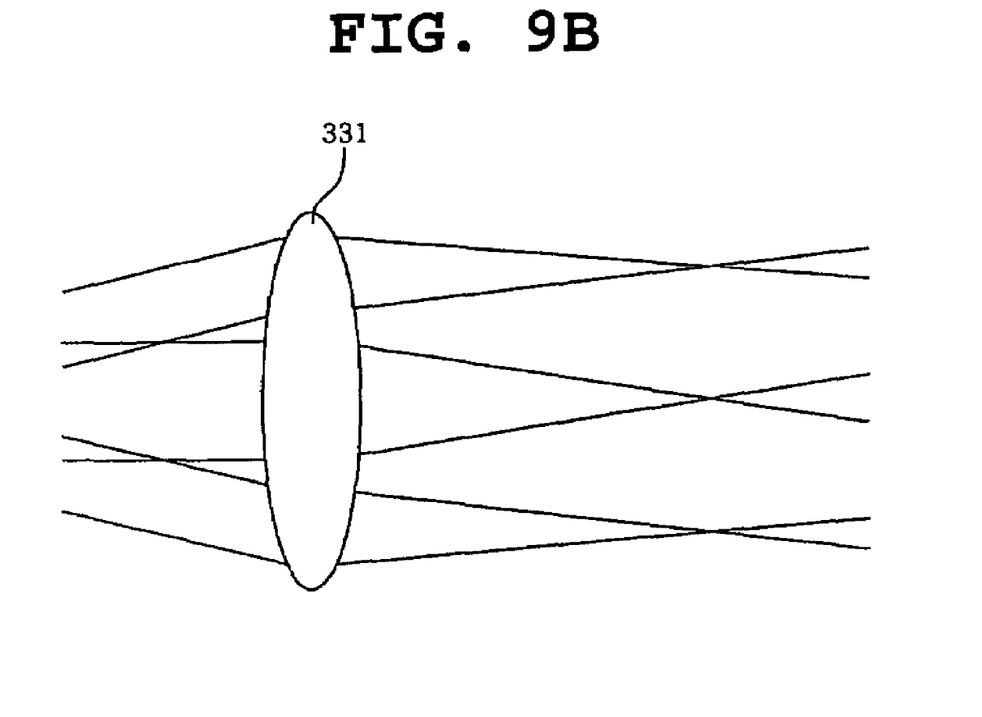

In this case, the Fourier lens 331 focuses light output from the beam splitter 322, as shown in FIGS. 9A and 9B. FIG. 9A is a plan view, and FIG. 9B is a side sectional view.

Referring to FIG. 9A, when three beams having different wavelengths, respectively, are incident on the Fourier lens 331, the Fourier lens 331 focuses the three beams.

Figure 10:
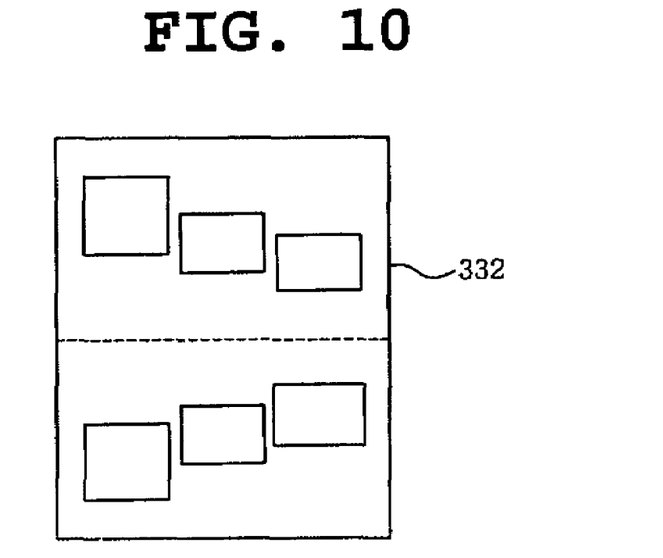
FIG. 10 is a front view illustrating the filter unit of FIG. 3.

Further, FIG. 9B shows a side sectional view for one of the three beams. After 0-order diffracted light passes through the Fourier lens 331, the 0-order diffracted light is focused on a focal point. In this case, +1-order diffracted light is focused on a position above the focal point where the 0-order diffracted light is focused, and −1-order diffracted light is focused on a position below the focal point where the 0-order diffracted light is focused. If the filter unit 332 is located near the focal points, only diffracted light having desired orders can pass through the filter unit 332. A front view of the filter unit 332 used in this case is shown in FIG. 10. Since the distance between the 0-order diffracted light and the ±1-order diffracted light varies with the wavelength, they can be separated using the mechanical filter unit 332.

The projection system 340 projects incident diffracted light onto the screen 350. That is, the projection system 340 functions to focus diffracted light beams having predetermined diffraction coefficients, which are incident through the filter unit 332, onto the screen 350, thereby forming a spot. More particularly, the projection system 340 may be a projection lens.

As described above, the present invention is advantageous in that a simple optical system can be constructed using a mechanical filter unit having a plurality of spatially separated slits, and a color image can be implemented by the simple optical system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A color display apparatus having a virtual single light origin, comprising:
    an illumination lens system for converting a plurality of light beams, which are radiated from a plurality of light sources, into linear, parallel light beams;
    a combining system for producing a plurality of diffracted light beams having a plurality of diffraction orders by modulating each of the parallel light beams incident from the illumination lens, and outputting the plurality of diffracted light beams so that the diffracted light beams have a same virtual light origin and are adjacently located, said combining system comprising diffractive light modulators to modulate the parallel light beams, at least one of the diffractive light modulators is disposed at an inclined angle, said inclined angle selected so that the diffractive light beams emanating from the combining system appear to originate at a single point source of light;
    a Fourier filter for passing only some of the diffracted light beams, which have desired diffraction orders, therethrough; and
    a projection system for focusing the diffracted light beams, which are passed through the Fourier filter, on an object, and then allowing the focused diffracted light beams to scan the object.

2. The color display apparatus as set forth in claim 1, wherein:
    said diffractive light modulators modulating each of the parallel light beams incident from the illumination lens, and allowing the diffracted light beams to be incident on a beam splitter so that the diffracted light beams output from the beam splitter can have a virtual single light point source origin and be adjacently located; and
    said beam splitter transmitting or reflecting the plurality of diffracted light beams having the plurality of diffraction orders.

3. The color display apparatus as set forth in claim 1, wherein the Fourier filter comprises:
    a Fourier lens for separating the plurality of diffracted light beams, which are incident from the combining system, on an order basis; and
    a filter unit for passing some of the separated diffracted light beams, which have desired orders, therethrough using spatially separated silts.

4. The color display apparatus as set forth in claim 1, wherein the at least one inclined diffractive light modulator is inclined at an angle of α degrees causing the diffracted light to be reflected at an angle of 2α degrees with respect to an X-prism surface.

5. The color display apparatus as set forth in claim 4, wherein:
    said diffractive light modulators modulating each of the parallel light beams incident from the illumination lens, and allowing the diffracted light beams to be incident on a beam splitter so that the diffracted light beams output from the beam splitter can have a virtual single point source light origin and be adjacent located; and
    said beam splitter transmitting or reflecting the plurality of diffracted light beams having the plurality of diffraction orders.

6. The color display apparatus as set forth in claim 4, wherein the Fourier filter comprises:
    a Fourier lens for separating the plurality of diffracted light beams, which are incident from the combining system, on an order basis; and
    a filter unit for passing some of the separated diffracted light beams, which have desired orders, therethrough using spatially separated silts.

7. A color display apparatus having a virtual single light origin, comprising:
    an illumination lens system for converting a plurality of light beams, which are radiated from a plurality of light sources, into linear, parallel light beams;
    a combining system for producing a plurality of diffracted light beams having a plurality of diffraction orders by modulating each of the parallel light beams so that the diffracted light beams have a same virtual light origin and are adjacently located, said combining system comprising open hole-type diffractive light modulators to modulate the parallel light beams;

a Fourier filter for passing only some of the diffracted light beams, which have desired diffraction orders, therethrough;

a projection system for focusing the diffracted light beams, which are passed through the Fourier filter, on an object, and then allowing the focused diffracted light beams to scan the object; and wherein the open hole-type diffractive light modulator comprising at least one piezoelectric material layer to effect actuation of the diffractive light modular.

8. A color display apparatus having a virtual single light origin, comprising:

an illumination lens system for converting a plurality of light beams, which are radiated from a plurality of light sources, into linear, parallel light beams;

a combining system for producing a plurality of diffracted light beams having a plurality of diffraction orders, said combining system comprising:

a plurality of light modulators to modulate the parallel light beams incident from the illumination lens; and a combiner receiving the modulated light beams and outputting the plurality of diffracted light beams so that the diffracted light beams have a single virtual point source light origin and emanate from the combiner such that the light of wave lengths corresponding r, g and b do not overlap with each other;

a Fourier filter for passing only some of the diffracted light beams, which have desired diffraction orders, therethrough; and a projection system for focusing the diffracted light beams, which are passed through the Fourier filter, on an object, and then allowing the focused diffracted light beams to scan the object.

9. The color display apparatus as set forth in claim 8, wherein:

said diffractive light modulators modulating each of the parallel light beams incident from the illumination lens, and allowing the diffracted light beams to be incident on the combiner, said combiner in the form of a beam splitter so that the diffracted light beams output from the beam splitter can have a virtual single light point source origin and be adjacent located; and said beam splitter transmitting or reflecting the plurality of diffracted light beams having the plurality of diffraction orders.

10. The color display apparatus as set forth in claim 8, wherein the Fourier filter comprises:

a Fourier lens for separating the plurality of diffracted light beams, which are incident from the combiner, on an order basis; and a filter unit for passing some of the separated diffracted light beams, which have desired orders, therethrough using spatially separated silts.

11. The color display apparatus as set forth in claim 8, wherein the diffractive light modulator comprising at least one piezoelectric material layer to effect actuation of the diffractive light modulator.

12. The color light display as set forth in claim 8, wherein the diffractive light modulators comprise open hole-type diffractive light modulators.

13. The color display apparatus as set forth in claim 12, wherein the open hole-type diffractive light modulators comprising at least one piezoelectric material layer to effect actuation of the diffractive light modulator.

14. The color display apparatus as set forth in claim 8, wherein at least one of the diffractive light modulators is disposed at an inclined angle, said inclined angle selected so that the diffractive light beams emanating from the combining system appear to originate at a single point source of light.

15. The color display apparatus as set forth in claim 8, wherein the at least one inclined diffractive light modulator is inclined at an angle of $\alpha$ degrees causing the diffracted light to be reflected at an angle of $2\alpha$ degrees with respect to an X-prism surface.

16. The color display apparatus as set forth in claim 15, wherein:

said diffractive light modulators modulating each of the parallel light beams incident from the illumination lens, and allowing the diffracted light beams to be incident on the combiner, said combiner comprising a beam splitter so that the diffracted light beams output from the beam splitter can have a virtual single light point source origin and be adjacently located; and said beam splitter transmitting or reflecting the plurality of diffracted light beams having the plurality of diffraction orders.

17. The color display apparatus as set forth in claim 15, wherein the Fourier filter comprises:

a Fourier lens for separating the plurality of diffracted light beams, which are incident from the combiner, on an order basis; and a filter unit for passing some of the separated diffracted light beams, which have desired orders, therethrough using spatially separated silts.

* * * * *